Jan. 2, 1940.     O. A. SWANSON     2,185,235
RETRACTABLE LANDING GEAR
Original Filed Jan. 15, 1937     4 Sheets-Sheet 1
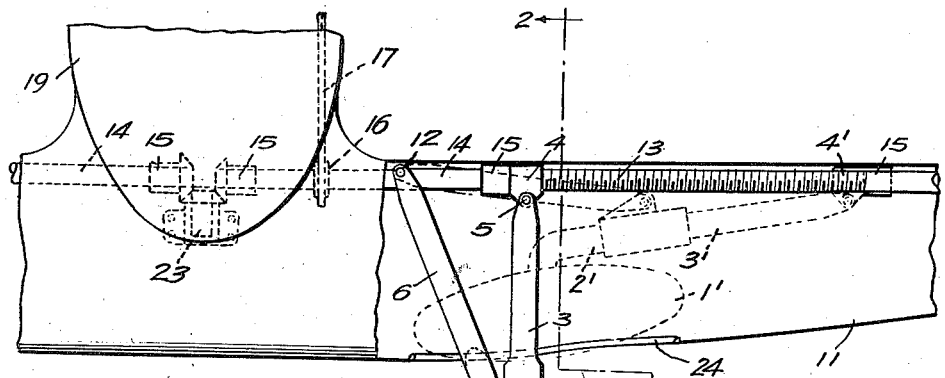
FIG. 1.
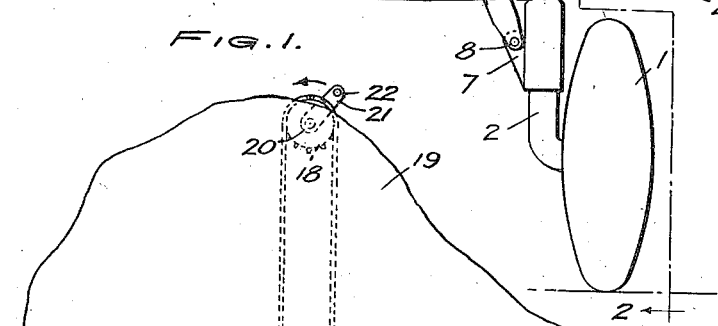
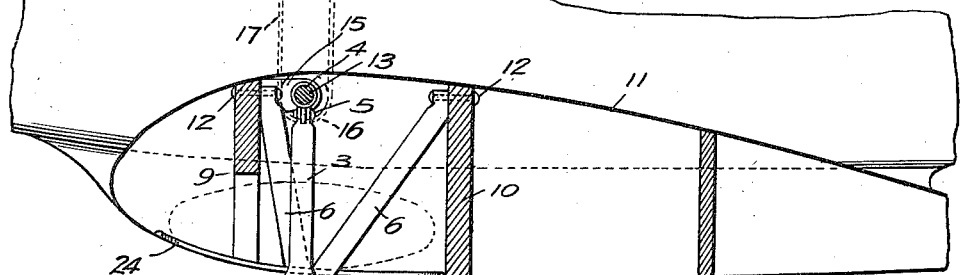
FIG. 2.
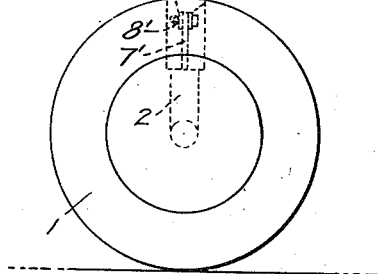
INVENTOR
OSCAR A. SWANSON
BY *John J. Horan*
*and Wade Kountz*
ATTORNEYS Jan. 2, 1940.　　　O. A. SWANSON　　　2,185,235
RETRACTABLE LANDING GEAR
Original Filed Jan. 15, 1937　　4 Sheets-Sheet 2

INVENTOR
OSCAR A. SWANSON
BY
ATTORNEYS

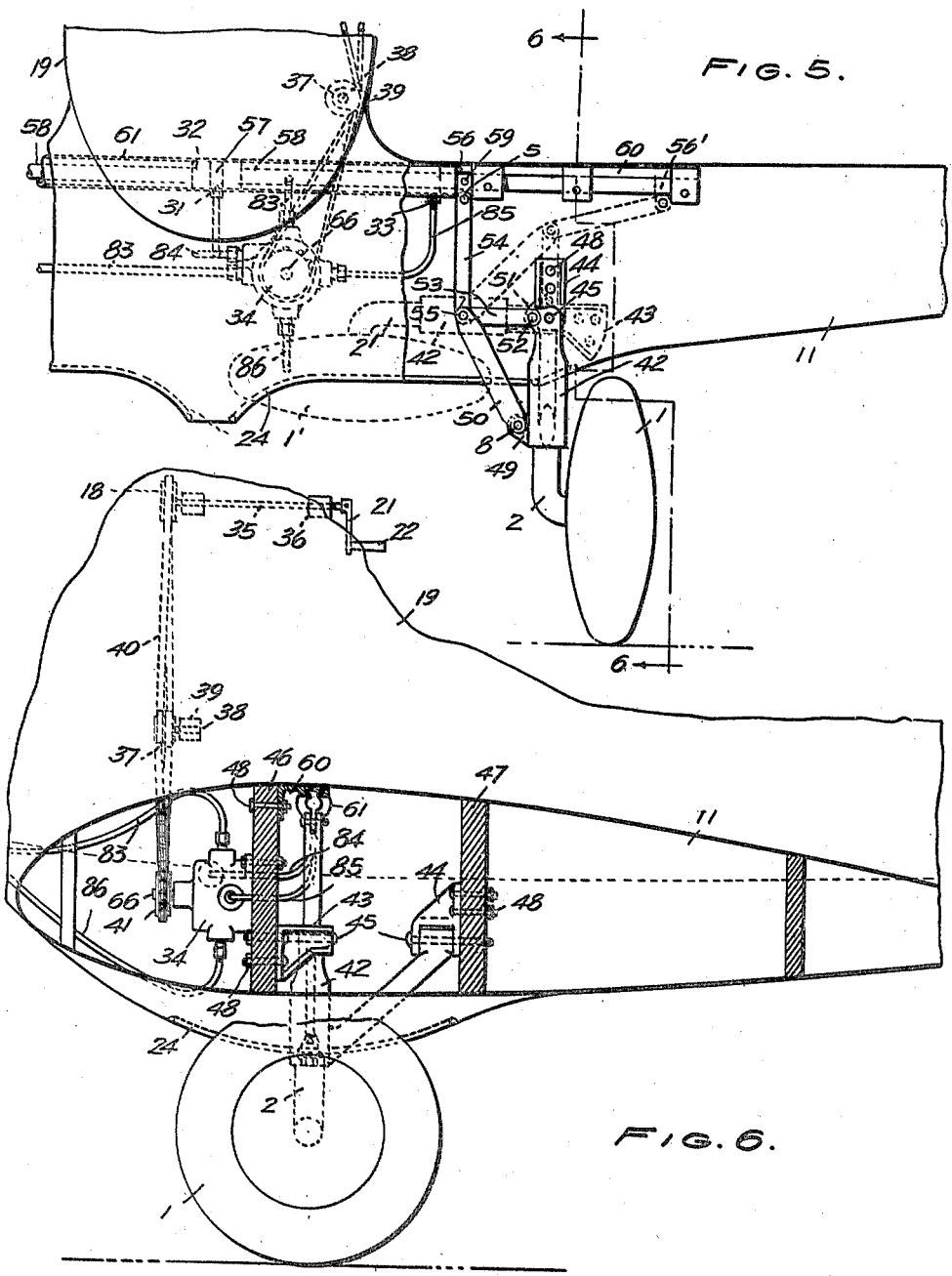

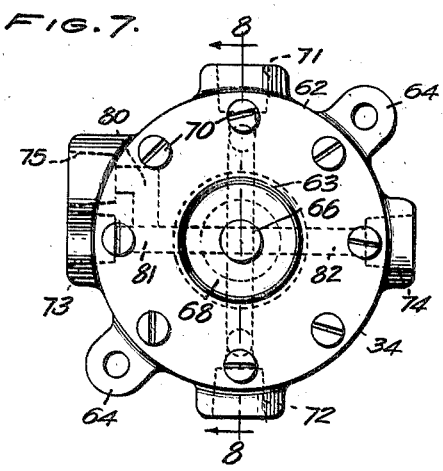
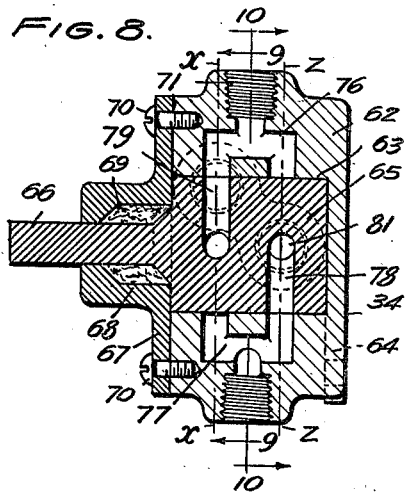
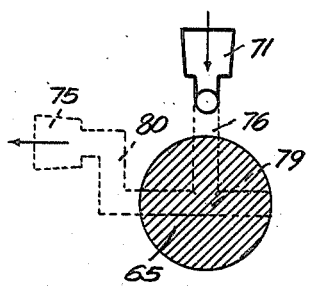
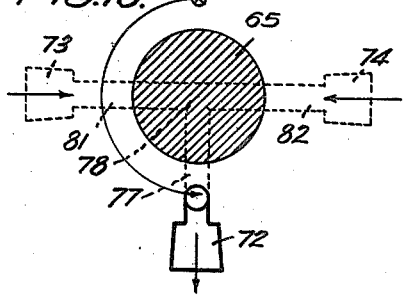
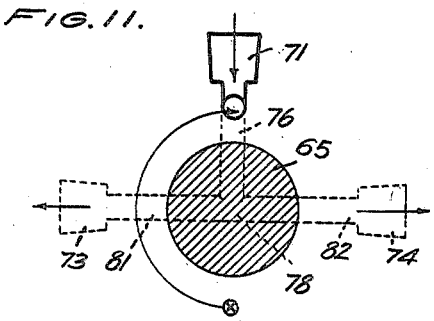
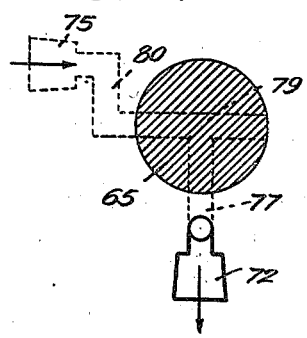

Patented Jan. 2, 1940

2,185,235

UNITED STATES PATENT OFFICE 2,185,235

RETRACTABLE LANDING GEAR

Oscar A. Swanson, Pacific Palisades, Calif.

Application January 15, 1937, Serial No. 120,787
Renewed February 23, 1939

9 Claims. (Cl. 244—102)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates in general to improvements in landing gears for aircraft and more particularly to an improved retractable landing gear adapted for use upon that type of airplane which is commonly designated "low wing monoplane".

The principal object of my invention is to provide for an airplane of the class described a retractable landing gear new and novel in its construction, simple of design, and completely efficient in its operation.

Another object of my invention is to construct the retracting mechanism that all of the struts and wheels of the gear are concealed within the lower surface of the wing when the aforesaid gear is in the retracted condition.

A further object of one embodiment of my invention is to secure the upper extremities of the oleo shock absorbing struts in such a manner that they may be shifted laterally in a direction substantially parallel to the wing spars while the upper extremities of the combined side and drag brace struts are secured to the wing structure by means of pin joints co-axially aligned in pairs substantially normal to the aforesaid wing spars. Outboard shifting of the upper extremities of the oleo shock absorbing struts effects an outward lateral folding reaction of the entire landing gear mechanism within the lower surface of the wing.

A further object of a second embodiment of my invention is to pivotally attach the common junction of a side brace strut and a horizontal link member to the lower extremities of each of two vertical link members having their upper extremities secured in such a manner that they may be shifted laterally in a direction substantially parallel to the wing spars while the upper extremities of the combined oleo shock absorbing and drag brace struts are secured to the wing structure by means of pin joints coaxially aligned to pairs substantially normal to the aforesaid wing spars. Outboard shifting of the upper extremities of the vertical links effects an inward lateral folding reaction of the struts and wheels of the landing gear within the lower surface of the wing.

In both of the aforesaid embodiments, it is a further object of my invention to provide openings in the lower surface of the wing substantially coextensive with the plan outlines of the landing gear wheels in retracted position. Thru the above construction, the lower surface of the wing is substantially unbroken, during airplane flight.

A still further object of my invention is to provide a structural arrangement of parts such that the mechanical advantages employed for affecting retraction or extension of the gear mechanism as a whole will require a minimum of time and work. All of the foregoing is accomplished thru an extremely simple and practical parts disposition.

With the foregoing and other objects in view, which will appear as the description proceeds, the invention consists in certain new and novel improvements in retractable landing gears, which will be hereinafter more fully illustrated and described in the accompanying drawings and more particularly pointed out in the appended claims.

Referring to the drawings, in which numerals of like character designate similar parts throughout the several claims:

Figure 1 is a fragmental view of the nose and left wing stub of a low wing monoplane incorporating my invention;

Figure 2 is a side fragmental view taken partially on the lines 2—2 of Figure 1.

Figure 5 is a fragmental view of the nose and left wing stub of a second low wing monoplane incorporating a second embodiment of my invention;

Figure 6 is a side fragmental view taken partially on the lines 6—6 of Figure 5.

Figure 7 is a frontal view of a fluid control valve used in Figures 3 through 6;

Figure 8 is a sectional view taken on the line 8—8 of Figure 7;

Figure 9 shows diagrammatically fluid ingress through the control valve to effect gear retraction;

Figure 3:
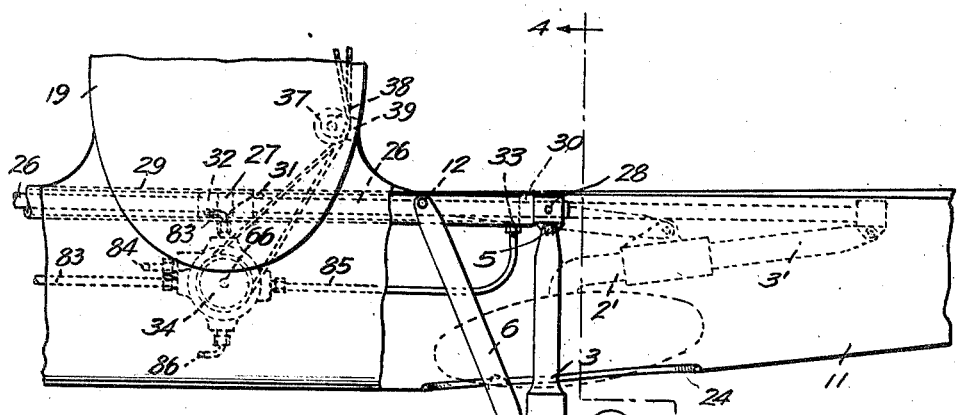
Figure 3 is similar to Figure 1, except that the gear is fluid operated.

Figure 10 similarly shows fluid egress through the control valve with gear retraction;

Figure 11 shows fluid ingress through the control valve to effect gear extension; and Figure 12 shows fluid egress through the control valve with gear extension.

In Figures 1 and 2, description of the left hand portion of a retractable landing gear will suffice for the entire mechanism, the right portion of which has been omitted from the drawings. A landing gear wheel 1 is secured to a wheel supporting leg 2 in conventional manner. The upper portion of the leg 2 operably engages an oleo shock absorbing strut 3 in such a manner that the wheel 1 will not castor about the longitudinal axis of the strut 3. The upper end of the strut 3 is hingedly secured to an oleo shock absorbing strut mounting base 4 by means of a pin 5. A combined side and drag brace strut 6 is hingedly secured at its lower end to the strut 3 by means of a mounting flange 7 and lower mounting pin 8 and at its upper two ends is further hingedly secured to spars 9 and 10, of a wing 11, by means of upper mounting pins 12.

The oleo shock absorbing strut mounting base 4 is carried by a worn portion 13 of a drive shaft 14. The drive shaft 14 is secured to the spar 9 by means of bearing brackets 15 and is provided with a fixed sprocket 16 and a sprocket chain 17 for driving the same. The upper end of the sprocket chain 17 is operably engaged by a second sprocket 18 secured to the fuselage wall 19 by means of a journal 20. The sprocket 18 is driven by means of a crank 21 and handle 22. A differential gear 23 fixed to the spar 9 is provided to assure equal and opposite rotation of a second driving shaft 14 operating the right hand portion of the retracting mechanism not shown in Figure 1.

As shown in Figure 1, the landing gear wheel 1 is fully extended in anticipation of the take-off or landing of an airplane. Once the airplane is well under flight, the crank handle 22 is turned in a counter-clockwise direction until the oleo shock absorbing strut mounting base 4 has travelled in an outboard lateral direction into the dotted position 4'. With assumption of dotted position 4', the landing gear wheel 1, the wheel supporting leg 2 and the oleo shock absorbing strut 3 are folded upwardly and outwardly into the dotted positions 1', 2' and 3'; entirely within the lower surface of the wing 11. It will be noted that the dotted bottom surface of the wheel 1, in position 1', substantially covers an opening 24 provided in the aforesaid bottom surface of the wing 11 for extension and retraction of the left hand portion of the landing gear.

With the single exception of the gear extending and retractable mechanism, the part dispositions of Figures 1 through 4 are identical. In the latter two figures, the upper end of the strut 3 is hingedly secured to an oleo shock absorbing strut mounting base 25 by means of the pin 5. The base 25 is carried by a piston rod 26 of a fluid pressure motor 27, being fixed against lateral movement by means of a pin 28. The fluid pressure motor 27 consists of a single cylindrical housing 29, fixed to the spar 9; headers 30; a central fluid ingress-egress opening 31; pistons 32; and end fluid ingress-egress openings 33. Actuation of the fluid pressure motor 27 is governed by a control valve 34 operated from within the fuselage wall 19 by means of the crank 21 and handle 22. The crank 21 is fixed to one end and the sprocket 18 is fixed to the other end of a drive shaft 35 secured to the fuselage wall 19 by means of bearing brackets 36. Idler sprockets 37, secured to the fuselage wall 19 by means of a journal 38 and journal bracket 39, guide the sprocket chain 40 into operable engagement with a sprocket 41 fixed to the control valve 34. Operation of the latter valve will be described in detail hereinafter.

Figures 5 and 6 show a second embodiment of my invention in which the upper ends of a combined oleo shock absorber and drag strut 42 are hingedly secured to mounting brackets 43 and 44 by means of pins 45. The mounting brackets 43 and 44 are secured, respectively, to spars 46 and 47 by means of bolts 48. The shock and drag strut 42 is provided with a mounting flange 49 and the pin 8 for securing the lower end of a side brace strut 50 and with a mounting lug 51 and a pin 52 for securing the outboard end of a horizontal strut link 53. The inboard end of the strut link 53, the upper end of the side brace strut 50, and the lower end of a vertical strut link 54 are secured in coaxial alignment by a pin 55. The upper end of the vertical strut link 54 is hingedly secured to a vertical strut link mounting base 56 by means of the pin 5. The base 56 is fixed to the outer end of a piston rod 58 of a second fluid pressure motor 57 by means of a pin 59 and is further slidably supported in its outboard lateral movements by a tract 60 fixed to the spar 46 by means of the bolts 48. The fluid pressure motor 57 differs from its predecessor only in that a cylindrical housing 61 is foreshortened with respect to the over-all length of the cylindrical housing 29 employed in the fluid pressure motor 27.

As in Figures 1 and 3, the landing gear wheel 1 of Figure 5 is fully extended. Thru proper adjustment of the control valve 34, in a manner identical to that employed for the structure of Figure 3, the vertical strut link mounting base 56 is caused to travel in an outboard lateral direction along the track 60 into the dotted position 56'. With assumption of dotted position 56', the landing gear wheel 1, the wheel supporting leg 2 and the combined oleo shock absorbing and drag strut 42 are folded upwardly and inwardly in the dotted positions 1', 2' and 42'; entirely within the lower surface of the wing 11. It will be noted that the dotted bottom surface of the wheel 1, in position 1', substantially covers the opening 24 provided in the lower surface of the wing 11 for extension and retraction of the left hand portion of the landing gear.

Figure 4:
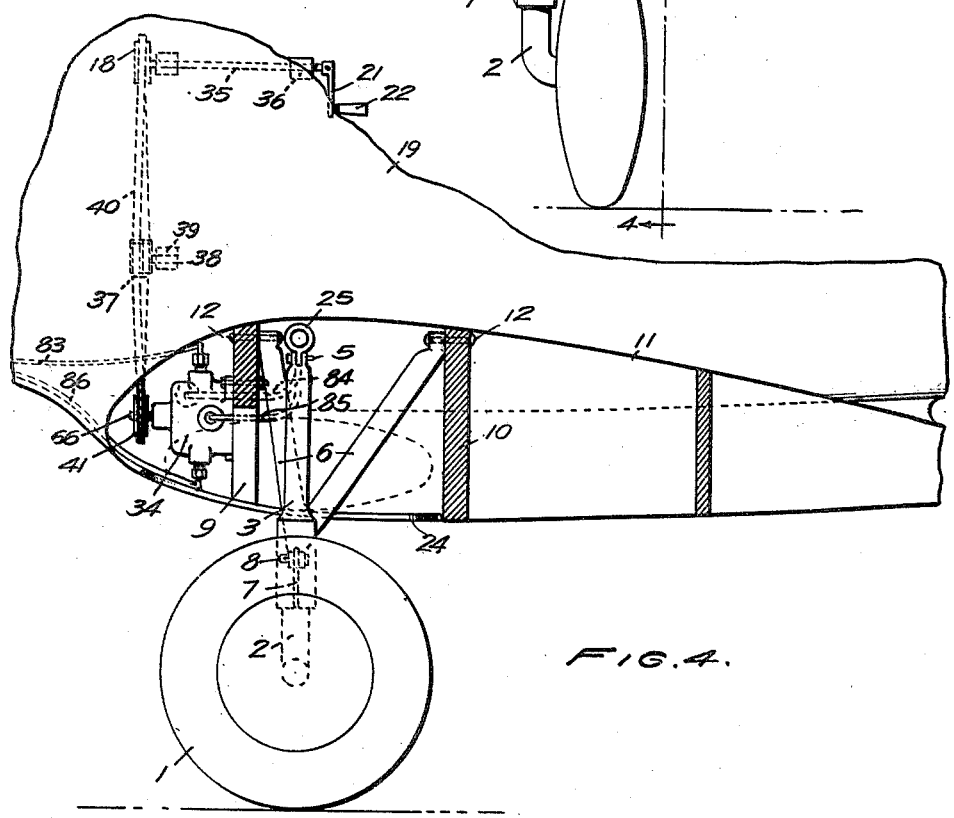
Figure 4 is a side fragmental view taken partially on the lines 4—4 of Figure 3.

The control valve 34, illustrated in Figures 4 and 6, is shown in detail in Figures 7 and 8. The valve consists of a body 62, with a central cylindrical cavity 63 and mounting lugs 64; a cylindrical plug 65, with a turning stem 66; and a cover plate 67, with a stuffing box 68, a packing 69 and retaining screws 70.

As a material aid in describing the forthcoming "bores", "passages" and exterior "openings" in the plug 65 and the body 62, through parallel planes of referred $x$—$x$, $y$—$y$, and $z$—$z$ have been established, as shown in end profile in Figure 10. Fluid under pressure is introduced thru an inlet opening 71. Since the pistons 32 of the fluid pressure motors 27 and 57 are double acting, an overflow opening 72 must also be provided. It will be noted that both of the aforesaid openings are bi-sected by the reference plane $y$—$y$. Fluid passage with reference to the end fluid ingress-egress openings 33 of the fluid pressure motors 27 and 57 is accomplished by means of ingress-egress openings 73 and 74. It will be noted that both of the above are bi-sected by the reference plane $z$—$z$. The remaining fluid passage with reference to the central fluid ingress-egress opening 31 of the fluid pressure motors 27 and 57 is accomplished by means of an ingress-egress opening 75, bi-sected by the plane of reference $x$—$x$.

As viewed in Figures 7 and 8, the inlet opening 71 is interconnected with an inverted U-shaped passage 76, while the overflow opening 72 is interconnected with a U-shaped passage 77, both passages being bi-sected by a vertical plane passed through the longitudinal axis of the cylindrical plug 65. It will be noted that the right hand upright portions of the passages 76 and 77 (Figure 8) are bi-sected by the plane of reference $z$—$z$, which further bi-sects an inverted T-shaped bore 78 provided in the cylindrical plug 65, while the left hand portions thereof are bi-sected by the plane of reference $x$—$x$, which further bi-sects a T-shaped bore 79 provided in the aforesaid cylindrical plug 65 and a Z-shaped passage 80 provided in the body 62 and having common interconnection with the ingress-egress opening 75. It will further be noted that the upper bar of the T-shaped bore 78 is interconnected with the ingress-egress openings 73 and 74 by means of bores 81 and 82 provided in the body 62.

With the plug setting of Figures 7 and 8, fluid ingress is depicted in the flow-diagram of Figure 9 and fluid egress is depicted in the flow diagram or Figure 10. Fluid from a pressure source not shown is led into the openings 71 of the control valves 34 (Figures 3 through 6) by means of an inlet tubing 83; from thence through the passage 76, the bore 79, the passage 80, to the opening 75; from whence it is led through an ingress-egress tubing 84 to the central fluid ingress-egress opening 31 of the fluid pressure motors 27 and 57. Since no appreciable ingress of fluid can occur at the opening 31 without approximate egress of fluid from the end fluid ingress-egress openings 33, the latter openings are connected to the ingress-egress openings 73 and 74 of the body 62 by means of ingress-egress tubing 85 such that over-flow fluid may pass through bores 81 and 82 (in the body 62), the bore 78, the passage 77, to the overflow opening 72. The last named opening is connected to the original source of fluid pressure supply by means of an overflow tubing 86. It is thus obvious with the control valve setting of Figures 7 and 8 that continued pressure in the inlet tubing 83 will cause immediate retraction of the landing gear wheel 1 within the under surfaces of the wings 11 of Figures 3 through 6.

If the turning stems 66 of the control valves 34 be rotated 180 degrees from the stem position shown in Figures 7 and 8, the fluid ingress and egress depicted in the flow diagrams of Figures 11 and 12 will obtain. Fluid introduced at the inlet opening 71 will flow through the passage 76, the bore 78, and the bores 81 and 82 (in the body 62), to the ingress-egress openings 73 and 74. Conversely, fluid overflow from the ingress-egress opening 75 will flow through the passage 80, the open ends of the bore 79, and the passage 77, to the overflow opening 72. It is thus a simple matter for the pilot of an aircraft, by proper rotation of the crank handle 22 secured to the fuselage wall 19, to effect retraction or extension of his landing gear during flights.

Although the description is specific to the illustrations in the drawings, it is to be understood that there may be numerous departures therefrom which will still be within the field and scope of the invention, so that I do not wish to be restricted thereto, but only in so far as the appended claims are so limited.

What I claim is:

1. In a low wing monoplane provided with retractable landing gear and wheels, a wing panel having a pair of substantially circular cavities formed in the under surface thereof, the plan of said wing cavities slightly exceeding landing wheel diameter and being adjacently symmetrically disposed to either side of the longitudinal axis of said monoplane, a fluid pressure motor with oppositely disposed piston rods laterally projectable over the tops of said wing cavities, the outer end of each piston rod including a mounting base inwardly positioned within plan cavity profile upon full gear extension, a landing gear wheel shock absorbing structure with upper end pivotally connected to said mounting base and lower exposed portion depending from each of said wing cavities, within the plan profiles thereof, a side brace structure with lower end pivotally connected to each of said shock absorbing structures between the ends thereof, such that all exposed portions of the aforesaid structures lie entirely within wing cavity plan confine, the upper unexposed portions of the combined side brace structures inwardly converging to pivotal top connection with the internal wing structure, a source of fluid pressure supply, and means for controlling fluid ingress and egress with reference to said fluid pressure motor.

2. In a low wing monoplane provided with retractable landing gear and wheels, a wing panel having a pair of cavities formed in the under surface thereof, the circular plan of said wing cavities slightly exceeding landing wheel diameter and being adjacently symmetrically disposed to either side of the longitudinal axis of said monoplane, a fluid pressure motor with oppositely disposed piston rods laterally projectable over the tops of said wing cavities, the outer end of each piston rod including a mounting base inwardly positioned with full gear extension, a landing gear wheel shock absorbing structure with upper end pivotally connected to said mounting base and lower portion depending from each of said wing cavities, a side brace structure located inboard of each of said shock absorbing structures with lower end pivotally connected thereto between the end portions thereof and upper end pivotally connected to the internal wing structure inboard of the mounting base from which said shock absorbing structure depends when fully extended, a source of fluid pressure supply, and means for controlling fluid ingress and egress to cause outboard lateral separation of the aforesaid mounting bases and coincidental elevation of said shock absorbing and brace structures.

3. In a low wing monoplane provided with retractable landing gear and wheels, a wing panel having a pair of substantially circular cavities formed in the under surface thereof, the plan of said wing cavities slightly exceeding landing wheel diameter and being adjacently symmetrically disposed to either side of the longitudinal axis of said monoplane, a combined oleo shock absorber and drag strut pivotally depending from the internal wing structure immediately above each of said wing cavity openings from an axis parallel to said longitudinal axis, a cabane side brace structure with bases fixed to each of said shock and drag struts such that the apexes thereof are substantially inboard of the aforesaid pivotal top connections, a fluid pressure motor with oppositely disposed piston rods laterally projectable over the tops of said wing cavities, the outer end of each piston rod including a mounting base lying in vertical coincidence with an associated cabane apex with full gear extension, a strut link with ends pivotally attached to each associated cabane apex and mounting base, a source of fluid pressure supply, and means for controlling fluid ingress and egress with reference to said fluid pressure motor.

4. In a low wing monoplane provided with retractable landing gear and wheels, a wing panel having a pair of substantially circular cavities formed in the under surface thereof, the plan of said wing cavities slightly exceeding landing wheel diameter and being adjacently symmetrically disposed to either side of the longitudinal axis of said monoplane, a combined oleo shock absorbing and drag strut pivotally depending from the internal wing structure immediately above each of said wing cavity openings from an axis parallel to said longitudinal axis, a cabane side brace structure with bases fixed to each of said shock and drag struts such that the apexes thereof are substantially inboard of the aforesaid pivotal top connections, a fluid pressure motor with oppositely disposed piston rods laterally projectable over the tops of said wing cavities, the outer end of each piston rod including a mounting base lying in vertical coincidence with an associated cabane apex with full gear extension, a strut link with ends pivotally attached to each associated cabane apex and mounting base, a source of fluid pressure supply, and means for controlling fluid ingress and egress to cause outboard lateral separation of the aforesaid mounting bases and coincidental inboard rotation of said shock and drag struts structures from a substantially vertical to a substantially horizontal disposition with full gear retraction.

5. In a low wing monoplane provided with retractable landing gear and wheels, a wing panel having a pair of substantially circular cavities formed in the under surface thereof, a landing gear wheel shock absorbing structure depending from pivotal attachment within each of the aforesaid wing cavities, and when extended lying entirely within the plan profiles thereof, a side brace structure with lower end pivotally attached to each of said shock absorbing structures such that all exposed portions thereof lie entirely within a wing cavity plan and pivotal upper end attachment within a wing cavity, and means to cause outboard lateral separation of the pivotal attachments of one pair of the aforesaid structures such that said landing gear wheels are simultaneously drawn upwardly and inwardly to substantially close said wing cavities.

6. In a low wing monoplane provided with retractable landing gear and wheels, a wing panel having a pair of cavities of circular plan formed in the under surface thereof, a landing gear wheel shock absorbing structure depending from pivotal attachment within each of the aforesaid wing cavities and when extended lying entirely within the plan profiles thereof, a side brace structure with lower end pivotally attached to each of said shock absorbing structures such that all exposed portions thereof lie entirely within a wing cavity plan and pivotal upper end attachment within a wing cavity, and means for retracting all exposed portions of said shock absorbing and brace structures through the plan confine of said wing cavity such that said landing gear wheels are simultaneously drawn upwardly and inwardly to substantially close said wing cavities.

7. In a low wing monoplane provided with retractable landing gear and wheels, a wing panel having a pair of substantially circular cavities formed in the under surface thereof, the plan of said wing cavities slightly exceeding landing wheel diameter and being adjacently symmetrically disposed to either side of the longitudinal axis of said monoplane, a landing gear wheel shock absorbing structure depending from pivotal attachment within each of the aforesaid wing cavities and when extended lying entirely within the plan profiles thereof, a side brace structure with lower end pivotally attached to each of said shock absorbing structures such that all exposed portions thereof lie entirely within a wing cavity plan and pivotal upper end attachment within a wing cavity, and means for retracting all exposed portions of said shock absorbing and brace structures through the plan confine of said wing cavity such that said landing gear wheels are simultaneously drawn upwardly and inwardly to substantially close said wing cavities.

8. In a low wing monoplane provided with retractable landing gear and wheels, a wing panel having a pair of substantially circular cavities formed in the under surface thereof, the plan of said wing cavities slightly exceeding landing wheel diameter and being adjacently symmetrically disposed to either side of the longitudinal axis of said monoplane, a pair of differentially coupled oppositely projecting shafts extending laterally over the tops of said wing cavities and having outboard worm portions each terminating in a pair of end bearings, a worm engaging mounting base carried by each of said worm portions, said mounting bases being inwardly positioned within wing cavity profile upon full gear extension, a landing gear wheel shock absorbing structure with upper end pivotally connected to said mounting base and lower exposed portion depending from each of said wing cavities within the plan profiles thereof, a side brace structure with lower exposed end pivotally connected to each of said shock absorbing structures between the ends thereof such that all exposed portions of the aforesaid structures lie entirely within wing cavity plan confines, the upper unexposed portions of the combined brace structures inwardly converging to pivotal top connection with structural portons of the wing within the aforesaid cavities, and means to rotate said oppositely projecting shafts.

9. In a low wing monoplane provided with retractable landing gear and wheels, a wing panel having a pair of substantially circular cavities formed in the under surface thereof, the plan of said wing cavities slightly exceeding landing wheel diameter and being adjacently symmetrically disposed to either side of the longitudinal axis of said monoplane, a pair of differentially coupled oppositely projecting shafts extending laterally over the tops of said wing cavities and having outboard worm portions each terminating in a pair of end bearings, a worm engaging mounting base carried by each of said worm portions, said mounting bases being inwardly positioned within wing cavity profile upon full gear extension, a landing gear wheel shock absorbing structure with upper end pivotally connected to said mounting base and lower exposed portion depending from each of said wing cavities within the plan profiles thereof, a side brace structure located inboard of each of said shock absorbing structures with lower exposed end pivotally connected thereto between the end portions thereof such that all exposed portions of the aforesaid structures lie entirely within wing cavity plan confine and upper unexposed end pivotally connected to a structural portion of the wing adjacent the aforesaid wing cavity substantially inboard of the mounting base from which said shock absorbing structure depends when fully extended, and means to rotate said oppositely projecting shafts to cause outboard lateral separation of the aforesaid mounting bases and coincidental elevation of said shock absorbing and brace structures.

OSCAR A. SWANSON.